US007230234B2

(12) United States Patent
Kobayashi

(10) Patent No.: US 7,230,234 B2
(45) Date of Patent: Jun. 12, 2007

(54) ORTHOGONAL ACCELERATION TIME-OF-FLIGHT MASS SPECTROMETER

(75) Inventor: Tatsuji Kobayashi, Tokyo (JP)

(73) Assignee: JEOL Ltd., Tokyo (JP)

( * ) Notice: Subject to any disclaimer, the term of this patent is extended or adjusted under 35 U.S.C. 154(b) by 117 days.

(21) Appl. No.: 11/180,984

(22) Filed: Jul. 13, 2005

(65) Prior Publication Data

US 2006/0016983 A1 Jan. 26, 2006

(30) Foreign Application Priority Data

Jul. 15, 2004 (JP) ............................ 2004-208910

(51) Int. Cl.
*H01J 49/40* (2006.01)
*B01D 59/44* (2006.01)
*H01J 49/00* (2006.01)

(52) U.S. Cl. ...................... 250/287; 250/281; 250/288; 250/282

(58) Field of Classification Search ................ 250/288, 250/287, 282, 281, 423 R, 292
See application file for complete search history.

(56) References Cited

U.S. PATENT DOCUMENTS 6,323,482 B1 * 11/2001 Clemmer et al. ........... 250/287
6,828,550 B2 * 12/2004 Griffey et al. .............. 250/281
2001/0032930 A1 * 10/2001 Gillig et al. ................ 250/288
2002/0121594 A1 * 9/2002 Wang et al. ................ 250/281
2005/0023458 A1 * 2/2005 Satoh et al. ................ 250/288

FOREIGN PATENT DOCUMENTS

JP 2004-134321 4/2004
JP 2004-139911 5/2004

* cited by examiner

*Primary Examiner*—Nikita Wells
*Assistant Examiner*—Johnnie L Smith, II
(74) *Attorney, Agent, or Firm*—The Webb Law Firm

(57) ABSTRACT

An orthogonal acceleration time-of-flight (oa-TOF) mass spectrometer has an ion source producing ions, a first region of a low degree of vacuum, an ion reservoir, and a second region of a high degree of vacuum. A space for transporting the ions produced by the ion source is placed in the first region. The ion reservoir accelerates the ions transported in from the first region in a pulsed manner and extracts the ions. A time-of-flight mass analyzer for mass separating the ions extracted from the ion reservoir is disposed in the second region, together with the ion reservoir. An isolation valve is mounted in a hole that places the first and second regions in communication with each other to permit the first and second regions to be isolated from each other.

10 Claims, 4 Drawing Sheets

ORTHOGONAL ACCELERATION TIME-OF-FLIGHT MASS SPECTROMETER

BACKGROUND OF THE INVENTION

1. Field of the Invention

The present invention relates to an orthogonal acceleration time-of-flight (oa-TOF) mass spectrometer and, more particularly, to an oa-TOF mass spectrometer which, if the ion source is contaminated with a sample, can remove the contaminant in a short time and resume measurements.

2. Description of Related Art

A mass spectrometer is an instrument in which ions created from a sample are made to travel through a vacuum. During the process of the flight, ions having different masses are separated and recorded as a spectrum. Known types of mass spectrometers include: magnetic mass spectrometer in which ions are dispersed according to mass using a sector magnetic field; quadrupole mass spectrometer (QMS) for sorting ions (filtering) according to mass using quadrupole electrodes; and time-of-fight mass spectrometer (TOFMS) for separating ions by making use of variations in time of flight due to different masses.

Of these mass spectrometers, magnetic mass spectrometer and QMS are adapted for ion sources that create ions continuously. On the other hand, TOFMS is suitable for ion sources that create pulsed ions. Accordingly, if one attempts to use a continuous ion source for TOFMS, some contrivance is necessary for utilization of the ion source. The orthogonal acceleration time-of-flight mass spectrometer (oa-TOFMS) is one example of TOFMS designed to emit pulsed ions from a continuous ion source.

A typical configuration of oa-TOFMS is shown in FIG. 1A. This instrument has a continuous atmospheric-pressure ion source 1 (such as electrospray ionization (ESI) ion source or inductively coupled plasma (ICP) ion source), differentially pumped walls 10*a*, 10*b* consisting of first and second partition walls and a vacuum pump (not shown), a first orifice 2 formed in the first partition wall of the differentially pumped walls 10*a*, 10*b*, a ring lens 3 placed within the differentially pumped walls 10*a*, 10*b*, a second orifice 4 formed in the second partition wall forming the differentially pumped walls 10*a*, 10*b*, an intermediate chamber 11 of a somewhat low degree of vacuum where an ion guide 5 is placed, lenses 6 consisting of focusing lenses and deflectors, a launcher 7 consisting of an ion repeller plate 7*a* and accelerating lenses (grids) 7*b*, a reflector 8 for reflecting ions, and a measuring chamber 13 of a high degree of vacuum where components forming the ion optics, such as an ion detector 9, are placed.

The various portions have the following degrees of vacuum. The degree of vacuum of the atmospheric-pressure ion source 1 is 0.1 MPa (atmospheric pressure). The degree of vacuum of the intermediate chamber 11 is in a range from $10^{-1}$ to $10^{-4}$ Pa. The degree of vacuum of the measuring chamber 13 is of the order of $10^{-5}$ Pa or better.

In this configuration, ions generated from the sample in the atmospheric-pressure ion source 1 are first introduced into the differentially pumped walls 10*a*, 10*b* through the first orifice 2. The ions tending to diffuse within the differentially pumped walls 10*a*, 10*b* are focused by the ring lens 3 in the walls 10. Then, the ions are admitted through the second orifice 4 into the intermediate chamber 11, where the ions are made uniform in kinetic energy. The ion beam diameter is reduced by an RF electric field produced by the ion guide 5. The ions are then guided into the high-vacuum measuring chamber 13. The partition wall that partitions the intermediate chamber 11 and the measuring chamber 13 from each other is provided with a third orifice 12 that places both chambers in communication with each other. This third orifice 12 shapes the ions that are guided in by the ion guide 5 into an ion beam of a given diameter (e.g., about 0.3 mm). The ion beam is then passed into the measuring chamber 13.

On the other hand, as shown in FIG. 1B, in an oa-TOFMS instrument having the continuous ion source 1 (such as electron impact (EI) ion source, chemical ionization (CI) ion source, field desorption (FD) ion source, or fast atom bombardment (FAB) ion source) in its intermediate chamber 11, ions produced in the ion source 1 pass through a focus lens 1' and an orifice 12 and are introduced into the measurement chamber 13.

These various ion sources roughly have the following degrees of vacuum. The degrees of vacuum of EI ion sources are $10^{-2}$ to $10^{-3}$ Pa. The degrees of vacuum of CI ion sources are $5\times10^{-2}$ to $5\times10^{-3}$ Pa. The degrees of vacuum of FD ion sources are of the order of $10^{-4}$ Pa. The degrees of vacuum of FAB ion sources are of the order of $10^{-3}$ Pa.

The lenses 6 consisting of the focusing lenses and deflectors are installed at the entrance of the measuring chamber 13. The ion beam entering the measuring chamber 13 is corrected for diffusion and deflection by the lenses 6 and introduced into the launcher 7. Installed inside the launcher 7 are the ion reservoir and accelerating lenses arrayed in a direction orthogonal to the axis of the ion reservoir. In this ion reservoir, an ion repeller plate is disposed opposite to the grids.

The ion beam first travels straight toward the ion reservoir 17 that is located among the repeller plate 14, grids 15, and accelerating lenses 16 as shown in FIG. 2. The ion beam 18 moving straight through the ion reservoir 17 and having a given length is accelerated in a pulsed manner in a direction (X-axis direction) vertical to the direction (Y-axis direction) along which the ion beam 18 enters, by applying a pulsed accelerating voltage to the repeller plate 14. This forms pulsed ions 19 which begin to travel toward a reflector (not shown) mounted opposite to the ion reservoir 17.

The ions accelerated in the vertical direction travel in a slightly oblique direction slightly deviating from the X-axis direction because the velocity in the Y-axis direction assumed on entering the measuring chamber 13 and the velocity in the X-axis direction orthogonal to the Y-axis direction are combined. The latter velocity is given by the repeller plate, grids, and accelerating lenses. The ions are reflected by the reflector 8 and arrive at the ion detector 9.

When the ions are being accelerated, the same potential difference acts on every ion regardless of the masses of the individual ions. Therefore, lighter ions have greater velocities and vice versa. As a consequence, variations in ion mass appear as variations in arrival time taken to reach the ion detector 9. Variations in ion mass can be separated as variations in ion flight time.

In this way, the continuous ion source can be applied to TOFMS adapted for a pulsed ion source by accelerating the ion beam created from the continuous ion source 1 in a pulsed manner by the launcher 7 consisting of the repeller plate, grids, and accelerating lenses.

In oa-TOFMS, the kinetic energy of ions made to enter the ion reservoir is normally set to a very small value of less than 50 eV. Therefore, oa-TOFMS is affected much more by charging of the electrodes than the magnetic mass spectrometer. As a result, if an area ranging from the external ion source to the ion reservoir is charged at all, the ion beam introduced into the ion reservoir is deflected and tilted as shown in FIG. 3. This deteriorates the resolution and sensitivity of oa-TOFMS.

Such charging can occur quite easily by adhesion of organics to the surfaces of the electrodes, the organics being residues of the sample ions. Especially, this phenomenon occurs quite easily in measurements using cold-spray ionization mass spectrometry that is one method of ESI (see Japanese Patent No. 3137953) or inductively coupled plasma-mass spectrometry (ICP-MS) because the concentration of the sample is very high and the components around the ion trajectory within the vacuum region on the side of the ion source are often contaminated in a short time.

A conventional measure for eliminating this problem consists of halting the operation of the oa-TOFMS, breaking the vacuum, taking components located around the ion trajectory within the vacuum region on the side of the ion source into the atmosphere, and cleaning the components.

If the cleaning is done by this method and then the components are mounted again, a waiting time of from about half to full day is necessary until the degree of vacuum of the oa-TOFMS is recovered. During this time interval, the instrument cannot be used.

On the other hand, in a normal gas chromatograph-mass spectrometer (GC-MS), a system having an isolation valve and a preliminary evacuation chamber has been already put into practical use such that contamination of the ion source can be removed while the vacuum in the mass spectrometer is maintained (see Japanese Patent Laid-Open No. 2004-134321 and Japanese Patent Laid-Open No. 2004-139911).

SUMMARY OF THE INVENTION

In view of the foregoing, it is an object of the present invention to provide an orthogonal acceleration time-of-flight mass spectrometer (oa-TOFMS) whose operation can be resumed in a short time if components around the ion trajectory within the vacuum region on the side of the ion source are taken into the atmosphere and cleaned or otherwise operated and which permits stable measurements if an isolation valve is mounted.

An oa-TOFMS instrument for achieving this object in accordance with the present invention has an ion source for producing ions, a first region of a low degree of vacuum, a space for transporting the produced ions, the space being placed in the first region, an ion reservoir for accelerating the ions transported in from the first region in a pulsed manner and extracting the ions, a second region of a high degree of vacuum, a flight time mass analyzer for mass separating the ions extracted from the ion reservoir, the ion reservoir and the mass analyzer being placed in the second region, and a hole for placing the first and second regions in communication with each other. A partition valve is mounted in the hole such that the regions can be isolated from each other.

In one feature of the present invention, the ion source is an atmospheric-pressure ion source consisting of an ESI ion source or ICP ion source.

In another feature of the present invention, the degree of vacuum of the first region is in a range from $10^{-1}$ Pa to $10^{-4}$ Pa.

In a further feature of the present invention, the degree of vacuum of the second region is of the order of $10^{-5}$ Pa or better.

In still another feature of the present invention, the partition valve is a gate valve or rotary valve through which an optical axis extends.

In yet another feature of the present invention, the partition valve is made of a gate valve fitted with an O-ring having a sealing surface facing away from the direction in which the ion beam travels.

In an additional feature of the present invention, an ion guide is placed in the space through which the ions produced by the ion source are transported, and an orifice plate having an orifice is placed between the ion guide and the partition valve.

In still another feature of the present invention, the orifice plate is mounted to the end of the ion guide that is on the side of the mass analyzer.

In yet another feature of the present invention, the orifice has a diameter slightly larger than the diameter of the ion beam being transported.

If components located around the ion trajectory in the vacuum region at a side of the ion source are taken into the atmosphere and cleaned, the instrument can be started to be used again in a short time.

The present invention also provides an oa-TOFMS instrument having an ion source for producing ions, a first region of a low degree of vacuum, a space for transporting the produced ions, the space being placed in the first region, an ion reservoir for accelerating the ions transported in from the first region in a pulsed manner and extracting the ions, a second region of a high degree of vacuum, a flight time mass analyzer for mass separating the ions extracted from the ion reservoir, the ion reservoir and the mass analyzer being placed in the second region, and a hole for placing the first and second regions in communication with each other. The ion source is one selected from the group consisting of EI ion source, CI ion source, FD ion source, and FAB ion source. A partition valve made of a gate valve is mounted in the hole. The gate valve is fitted with an O-ring having a sealing surface facing away from the direction in which the ion beam travels.

Other objects and features of the invention will appear in the course of the description thereof, which follows.

DESCRIPTION OF THE PREFERRED EMBODIMENTS

Figure 1A:
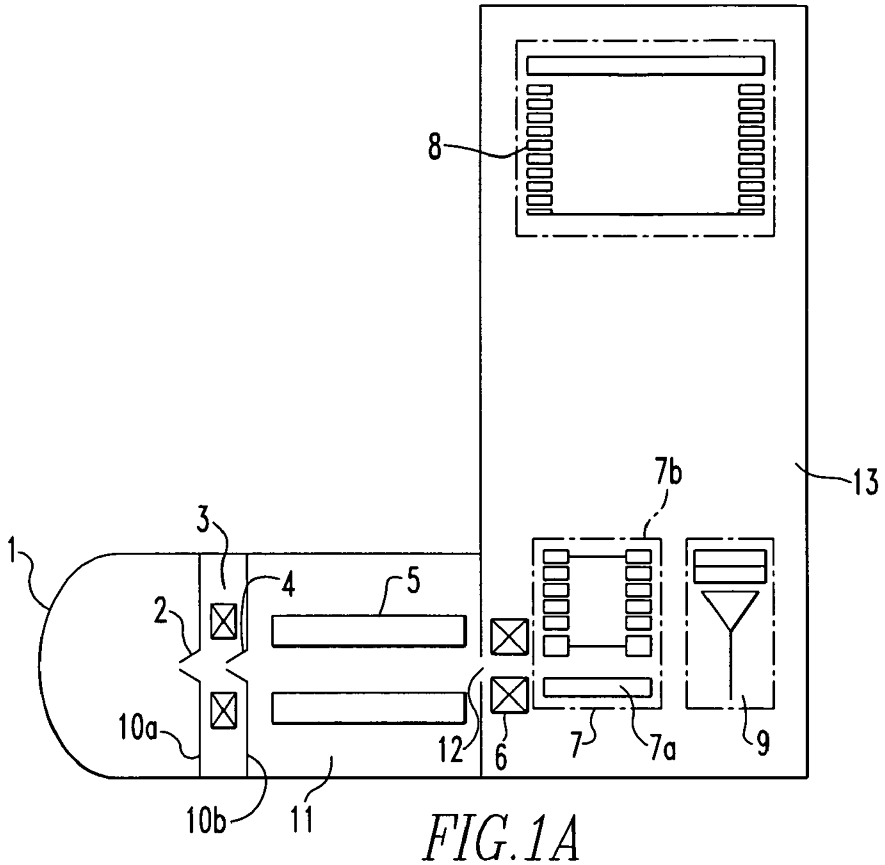
FIG.1A PRIOR ART
FIGS. 1A and 1B illustrate the prior art oa-TOFMS instrument.
Figure 1B:
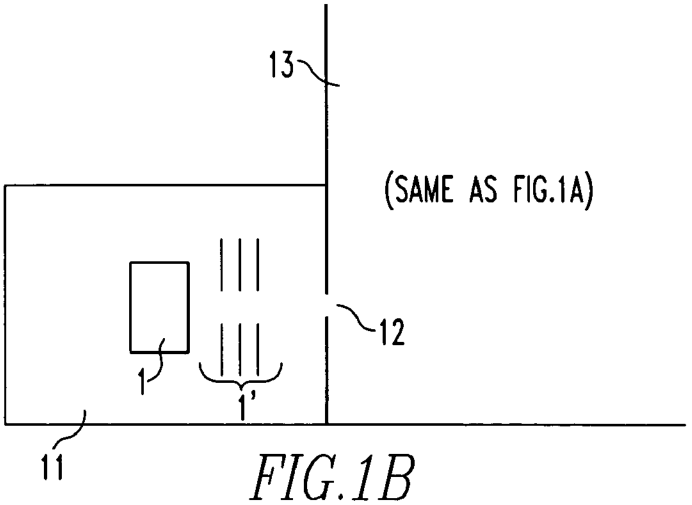
FIG.1B PRIOR ART
Figure 2:
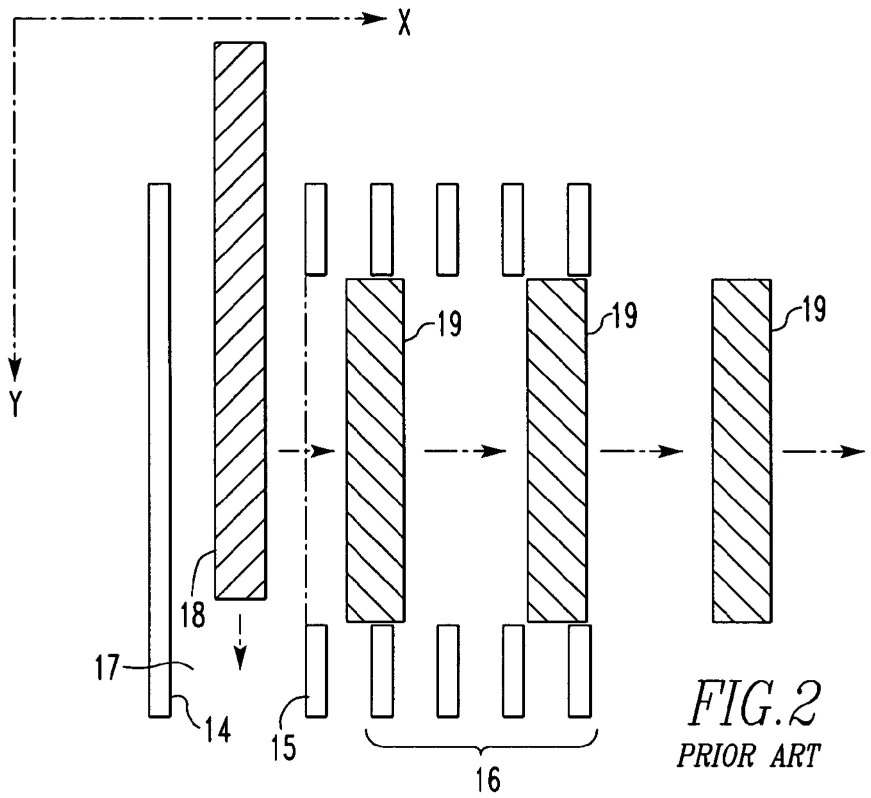
FIG. 2 PRIOR ART
FIG. 2 illustrates the vicinities of the ion reservoir of the prior art oa-TOFMS instrument.
Figure 3:
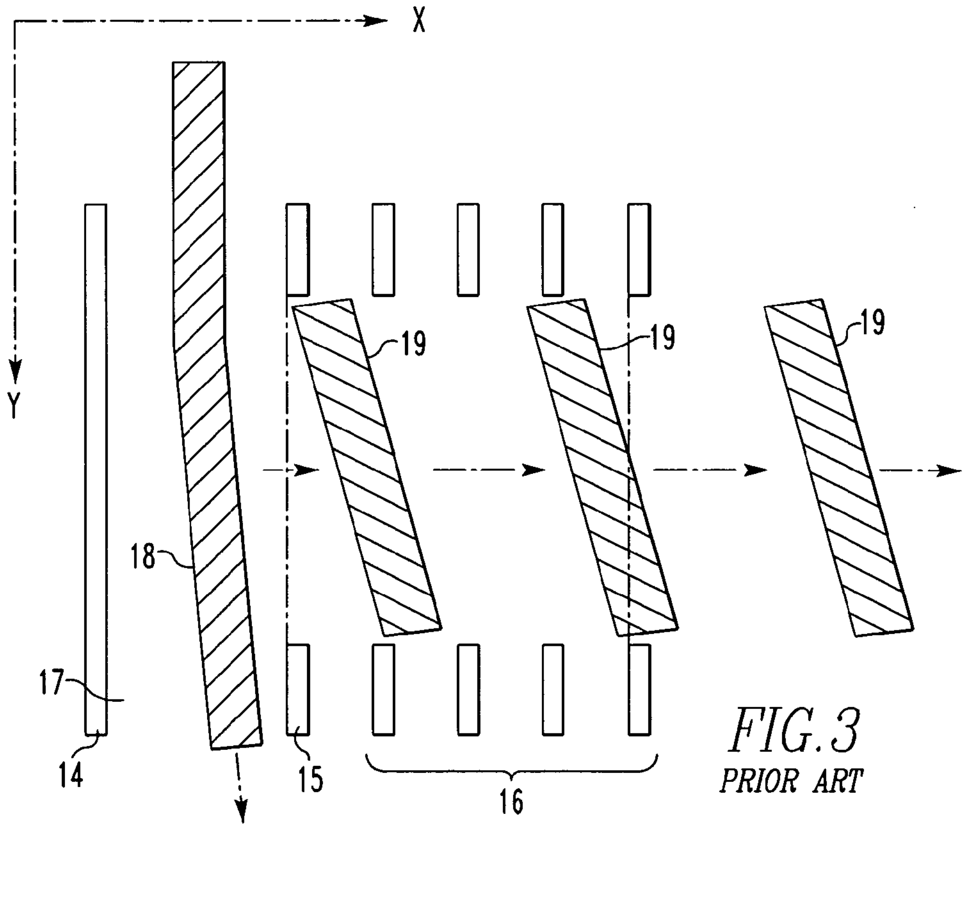
FIG. 3 PRIOR ART
FIG. 3 illustrates the vicinities of the ion reservoir of the prior art oa-TOFMS instrument, showing a state different from the state shown in FIG. 2.
Figure 4:
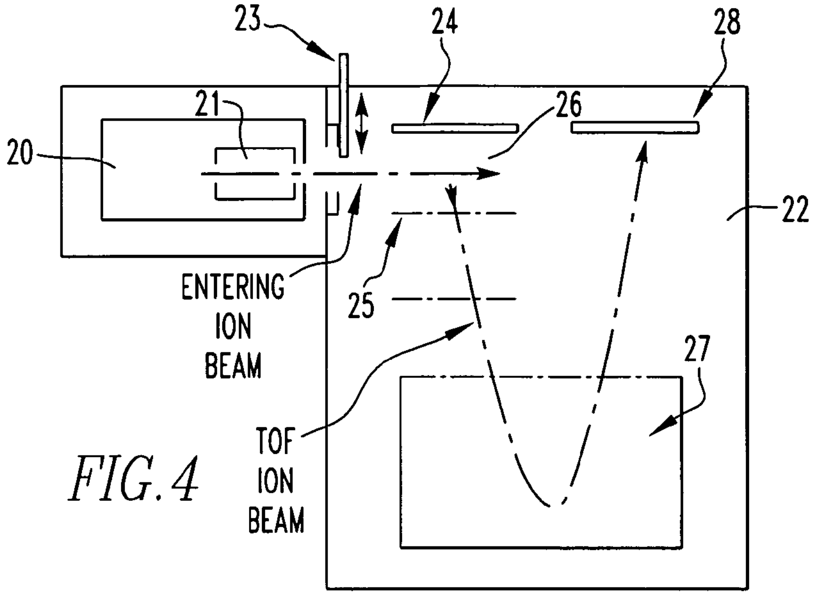
FIG. 4 is a diagram of an oa-TOFMS instrument according to the present invention.

The preferred embodiments of the present invention are hereinafter described with reference to the accompanying drawings. FIG. 4 shows an orthogonal acceleration time-of-flight (oa-TOF) mass spectrometer according to one embodiment of the present invention. This instrument comprises an external continuous ion source 20 (such as an electrospray ionization (ESI) ion source (known as a cold-spray ion source) or ICP ion source which tends to be easily contaminated with a sample), an ion transport portion 21 having a degree of vacuum of about $10^{-1}$ to $10^{-4}$ Pa (more preferably, about $10^{-2}$ to $10^{-3}$ Pa) for transporting the ions created ion source 20 toward an oa-TOF mass analyzer 22 located behind the ion transport portion 21. The analyzer 22 is placed in a degree of vacuum of the order of $10^{-5}$ Pa or better. An ion guide (not shown) is installed in the ion transport portion 21 to transport the ions efficiently from the ion source 20 to the mass analyzer 22.

The ion transport portion 21 and the oa-TOF mass analyzer 22 are partitioned by a partition wall provided with a hole to place these two portions 21 and 22 in communication with each other and to permit passage of ions. An isolation valve 23 is mounted in this hole. The two portions 21 and 22 can be separated spatially by the isolation valve 23. A gate valve is used as the isolation valve 23 and designed such that the optical axis extends through the hole and that the hole is plugged up by linear motion of the valve body. A rotary valve having a valve body that plugs up the hole when the valve body is rotated may also be used, if the optical axis extends through the hole.

Figure 5:
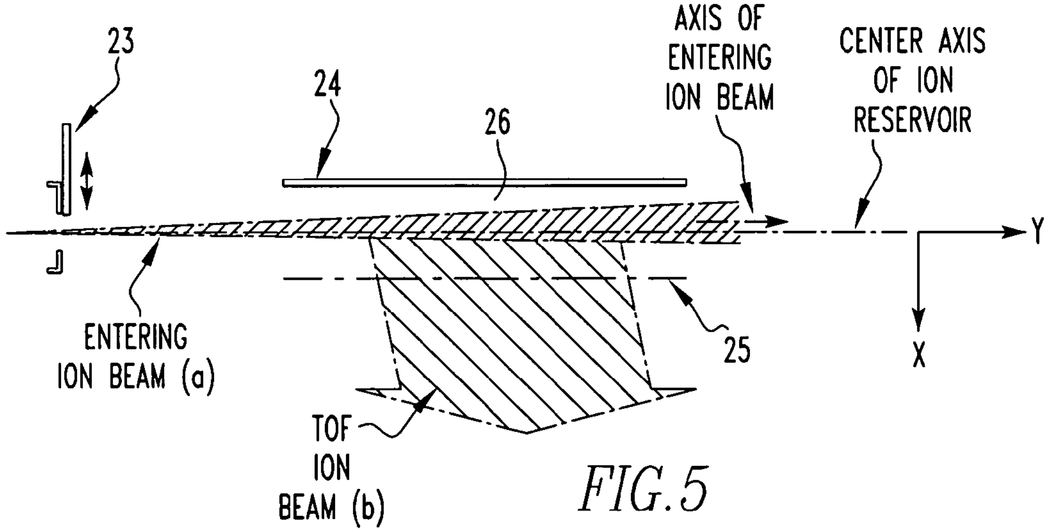
FIG. 5 illustrates the vicinities of the ion reservoir of the oa-TOFMS instrument shown in FIG. 4.
Figure 6:
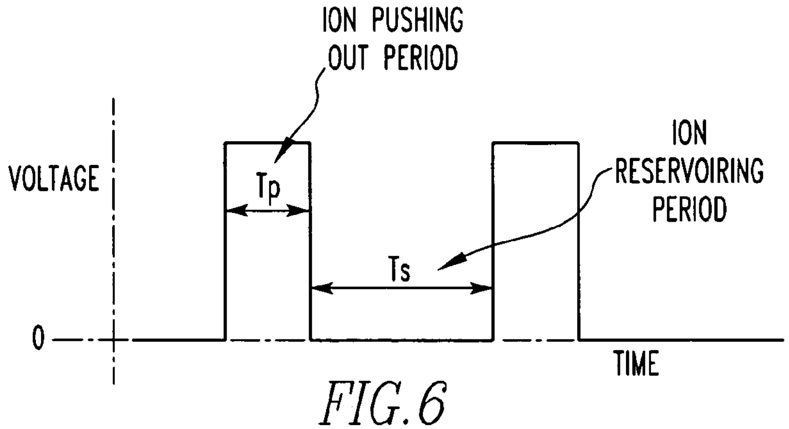
FIG. 6 is a diagram illustrating voltages applied to the ion repeller electrode of the instrument shown in FIGS. 4 and 5.

The ion beam first moves straight in a low-energy state of 20 to 50 eV toward an ion reservoir 26 as shown in FIG. 5. The reservoir 26 is sandwiched between an ion repeller electrode 24 and grids 25. The ion beam (a) has a given length and moves within the ion reservoir 26 parallel to it. A pulsed accelerating voltage of the order of kilovolts and having the same polarity as the ions as shown in FIG. 6 is applied to the ion repeller electrode 24. As a result, the ions are accelerated in a pulsed manner in a direction (X-axis direction) orthogonal to the direction (Y-axis direction) of an axis along which the ion beam (a) enters. This creates a TOF ion beam (b), which starts to fly toward a reflector 27 mounted in a position opposite to the ion reservoir 26.

The ions accelerated in the vertical direction fly in a slightly oblique direction slightly deviating from the X-axis direction, because the velocity in the Y-axis direction assumed on entering the oa-TOF mass analyzer 22 and the velocity in the X-axis direction orthogonal to the Y-axis direction are combined. The latter velocity is given by the ion repeller plate 24 and grids 25. The ions are reflected by the reflector 27 and arrive at an ion detector 28.

During the process of acceleration of the ions, the same potential difference acts on the ions regardless of their masses. Therefore, lighter ions fly faster and heavier ions fly slower. As a result, variations in ion mass appear as variations in arrival time to the ion detector 28. Variations in ion mass can be separated as variations in ion flight time.

Figure 7:
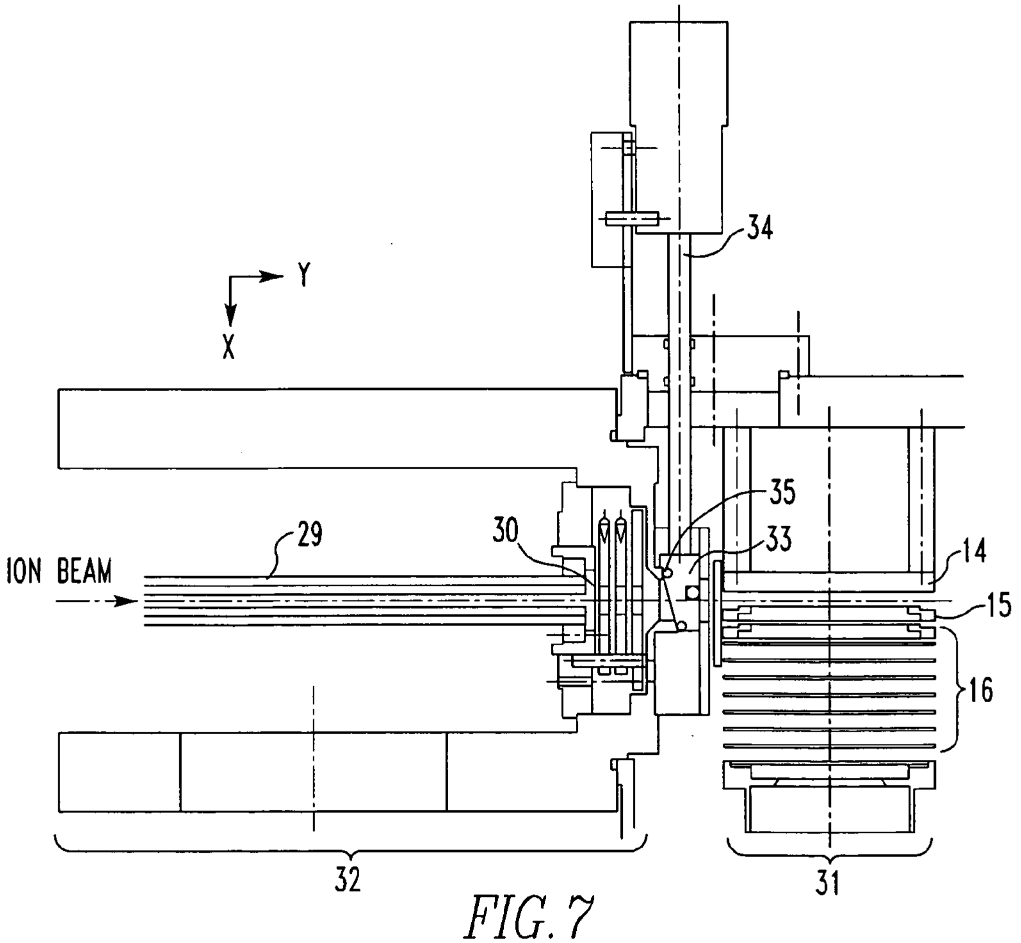
FIG. 7 illustrates the vicinities of the partition valve of an oa-TOFMS instrument according to the invention.

FIG. 7 is an enlarged view of the vicinities of an isolation valve of an oa-TOFMS according to the present invention. An ion guide 29 is mounted to guide ions created at atmospheric pressure (0.1 MPa) into a vacuum such that the ions can be transported without ion intensity loss from an intermediate chamber region of a somewhat low degree of vacuum ($10^{-2}$ to $10^{-3}$ Pa) to a measuring chamber region of a high degree of vacuum (of the order of $10^{-5}$ Pa or better). In the illustrated embodiment, an RF power supply (not shown) is connected with quadrupole electrodes to operate them as the ion guide.

An orifice plate 30 provided with an orifice having a diameter that is set such that the ion beam spatially restricted by the ion guide 29 and guided can narrowly pass through the orifice in the orifice plate 30. Because of the effect of this orifice diameter, the degree of vacuum of the mass analyzer 31 can be maintained in a state higher than the degree of vacuum of the ion transport portion 32 by two or three orders of magnitude. In particular, the diameter of the ion beam is 0.3 mm. The diameter of the orifice in the orifice plate 30 is about 1 to 20 times the diameter of the ion beam, i.e., about 0.3 to 6 mm, more preferably about 1.7 times, i.e., about 0.5 mm.

The orifice plate 30 is attached to the end of the ion guide 29 at the side of the mass analyzer. If the ion guide 29 is taken into the atmosphere, the orifice plate 30 can be taken into the atmosphere at the same time.

An isolation valve 33 is mounted behind the orifice plate 30. The isolation valve is made of a gate valve such that it is accommodated within a narrow space as viewed along the optical axis of the ions. The isolation valve 33 is opened and closed by a knob 34. Since the valve is made of the gate valve, the diameter of the partition portion can be made large. Consequently, the member forming the partition portion is located remotely from the optical axis of the ions. Hence, ions undergoing low acceleration energy are less affected by asymmetrical structure of the partition portion and by contaminant such as grease adhering to the surface. That is, the ions are less bent out of their trajectory. Furthermore, since a gate valve is used as the isolation valve, the thickness can be reduced if the diameter is increased compared with other types of isolation valves. As a consequence, the distance from the orifice in the orifice plate 30 to the mass analyzer 31 can be made small. Thus, the ion beam can be introduced into the mass analyzer 31 while reducing the effects of ion beam broadening.

The isolation valve 33 is fitted with an O-ring having a sealing surface 35. During the operation of the isolation valve 33, the sealing surface 35 is exposed to the ion beam and so tends to be contaminated with electrically charged substances. Therefore, the sealing surface 35 faces away from the direction of travel of the ion beam (Y-axis direction). Consequently, it is unlikely that the ion beam directly hits the sealing surface. The sealing surface is not easily electrically charged.

If the inside of the vacuum chamber is contaminated with the sample or the like, the isolation valve 33 is first closed. The vacuum pump (not shown) is stopped only on the side of the ion transport portion 32. The inside is placed at the atmospheric pressure. Then, a flange (not shown) is opened. The contaminated part is removed and cleaned. If the ion guide 29 is removed, the orifice plate 30 can be pulled out together. Consequently, the orifice plate 30 that tends to be contaminated can be cleaned together.

The cleaned part is mounted again. The vacuum pump (not shown) on the side of the ion transport portion 32 is restarted. The power supply of the ion source is turned ON to restart it. After a lapse of about 15 minutes, the isolation valve 33 is opened. Thus, preparations are made for remeasurements. In the time when the isolation valve 33 was not available, evacuation was required for from about half to full day until measurements could be resumed. Hence, a long waiting time was necessary. Hence, the time shortening effect is quite advantageous.

In the present embodiment, an orthogonal acceleration time-of-flight (oa-TOF) mass spectrometer equipped with an ESI ion source or ICP ion source has been described. Obviously, the invention can also be applied to an oa-TOF mass spectrometer equipped with an EI ion source, CI ion source, FD ion source, or FAB ion source.

The present invention can be used in a wide range of oa-TOF mass spectrometers.

Having thus described my invention with the detail and particularity required by the Patent Laws, what is desired protected by Letters Patent is set forth in the following claims.

The invention claimed is:

1. An orthogonal acceleration time-of-flight mass spectrometer comprising:

an ion source for producing ions;

a first region of a low degree of vacuum;

a space for transporting the produced ions, the space being disposed in said first region;

an ion reservoir for accelerating the ions transported in from said first region in a pulsed manner and extracting the ions;

a second region of a high degree of vacuum;

a time-of-flight mass analyzer for mass separating the ions extracted from said ion reservoir, said ion reservoir and said time-of-flight mass analyzer being disposed in said second region;

a hole that places said first and second regions in communication with each other; and an isolation valve mounted in said hole to permit said first and second regions to be isolated from each other.

2. The orthogonal acceleration time-of-flight mass spectrometer of claim 1, wherein said ion source is an atmospheric-pressure ion source consisting of an electrospray ionization (ESI) ion source or inductively coupled plasma (ICP) ion source.

3. The orthogonal acceleration time-of-flight mass spectrometer of claims 1 and 2, wherein the degree of vacuum of said first region is in a range from $10^{-1}$ Pa to $10^{-4}$ Pa.

4. The orthogonal acceleration time-of-flight mass spectrometer of claims 1 and 2, wherein the degree of vacuum of said second region is of the order of $10^{-5}$ Pa or better.

5. The orthogonal acceleration time-of-flight mass spectrometer of claims 1 and 2, wherein said isolation valve is a gate valve or rotary valve through which an optical axis extends.

6. The orthogonal acceleration time-of-flight mass spectrometer of claim 5, wherein said isolation valve is a gate valve fitted with an O-ring having a sealing surface facing away from the direction of travel of the ion beam.

7. The orthogonal acceleration time-of-flight mass spectrometer of claims 1 and 2, wherein an orifice plate having an orifice is mounted between said isolation valve and an ion guide placed in said space for transporting the ions produced by said ion source.

8. The orthogonal acceleration time-of-flight mass spectrometer of claim 7, wherein said orifice plate is attached to an end of the ion guide on a side of the mass analyzer.

9. The orthogonal acceleration time-of-flight mass spectrometer of claim 8, wherein said orifice has a diameter that is 1 to 20 times larger than the diameter of the ion beam being transported.

10. An orthogonal acceleration time-of-flight mass spectrometer comprising:

an ion source for producing ions;

a first region of a low degree of vacuum;

a space for transporting the produced ions, the space being disposed in said first region;

an ion reservoir for accelerating the ions transported in from said first region in a pulsed manner and extracting the ions;

a second region of a high degree of vacuum;

a time-of-flight mass analyzer for mass separating the ions extracted from said ion reservoir, said ion reservoir and said time-of-flight mass analyzer being disposed in said second region;

a hole that places said first and second regions in communication with each other; and an isolation valve mounted in said hole and made of a gate valve;

wherein said ion source is one selected from the group consisting of electron ionization (EI) ion source, chemical ionization (CI) ion source, field desorption (FD) ion source, and fast atom bombardment (FAB) ion source; and wherein said gate valve is fitted with an O-ring having a sealing surface facing away from the direction of travel of the ion beam.

* * * * *